(12) United States Patent
Livne et al.

(10) Patent No.: US 12,744,612 B2
(45) Date of Patent: Sep. 22, 2026

(54) PACKET TRANSMISSION SCHEDULING

(71) Applicant: Intel Corporation, Santa Clara, CA (US)

(72) Inventors: Sarig Livne, Schanya (IL); Hemanth Krishnan, Chandler, AZ (US); Adam Conyers, Phoenix, AZ (US); Chwei King Mok, Chandler, AZ (US); Michael G. Lefevre, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 184 days.

(21) Appl. No.: 17/463,441

(22) Filed: Aug. 31, 2021

(65) Prior Publication Data

US 2023/0061794 A1 Mar. 2, 2023

(51) Int. Cl.
*H04J 3/16* (2006.01)

(52) U.S. Cl.
CPC ...................................... *H04J 3/16* (2013.01)

(58) Field of Classification Search
CPC ............. H04J 3/16; H04L 47/56; H04L 47/28
See application file for complete search history.

(56) References Cited

U.S. PATENT DOCUMENTS 7,515,533 B2 4/2009 Lu et al.
10,560,373 B2 2/2020 St-Laurent
2016/0338021 A1 11/2016 Chae et al.
2020/0314787 A1 10/2020 Liu et al.
2021/0266247 A1 8/2021 Sivaraj et al.
2022/0124039 A1 * 4/2022 Chandra ............. H04L 49/9084

OTHER PUBLICATIONS

International Search Report and Written Opinion for PCT Patent Application No. PCT/US22/38923, Mailed Nov. 14, 2022, 10 pages.
"QoS scheduling and queuing methods", RUCKUS FastIron QoS and Traffic Management Configuration Guide, 08.0.95, COMMSCOPE, https://docs.commscope.com/bundle/fastiron-08095-trafficguide/page/GUID-CCAE82F9-7B8B-46C0-A8BD-881DADA1AAC2.html, Last updated Jan. 3, 2018, 2 pages.
Saeed, Ahmed, et al., "Carousel: Scalable Traffic Shaping at End Hosts", In Proceedings of SIGCOMM '17, Los Angeles, CA, USA, Aug. 21-25, 14 pages.
Stephens, Brent et al., "Loom: Flexible and Efficient NIC Packet Scheduling", This paper is included in the Proceedings of the 16th USENIX Symposium on Networked Systems Design and Implementation (NSDI '19), Boston, MA, USA, Feb. 26-28, 2019, 15 pages.

* cited by examiner

*Primary Examiner* — Eric Myers
(74) *Attorney, Agent, or Firm* — Compass IP Law PC

(57) ABSTRACT

Examples described herein relate to a network interface device comprising circuitry to cause transmission of packets based on transmission times and use of at least one of multiple time slot granular scheduling lists, wherein the multiple time slot granular scheduling lists comprise at least one list of a first time slot duration and at least one list of a second time slot duration and wherein the first time slot duration is different than the second time slot duration. In some examples, a minimum delay value of a list of the at least one list of a second time slot duration corresponds to a maximum delay value of a list of the at least one list of a first time slot duration. In some examples, the at least one list of a first time slot duration comprises a fine granularity list and the at least one list of a second time slot duration comprises a coarse granularity list.

15 Claims, 10 Drawing Sheets

PACKET TRANSMISSION SCHEDULING

BACKGROUND

Packets can be scheduled for transmission at or near a particular time and transmitted by a network interface controller (NIC) in end-host servers. However, shaping the transmission of packets for multitudes of flows at prescribed rates for various network applications (e.g., video streams on a video server) with parallel and hierarchical layers of shaping topologies can be a processor-intensive task, particularly where a flow can be shaped over multiple hierarchical aggregation stages with nodes in each stage shaped in parallel. On a server, processor cycles utilized for packet scheduling and shaping reduce the server capacity for other applications.

A known approach to precise packet shaping is to use hierarchical timing wheels to schedule packets for a flow at precise time intervals using packet timestamps along with packet shaping using single or hierarchical aggregation of rates.

DETAILED DESCRIPTION

For packet transmission scheduling based on packet transmit time, instead of only using lists for small granularity time increment slots, some examples utilize lists with coarse grain (larger time increment) slots and lists with small granularity time increment slots. Lists with small granularity time increment slots can be reused to store packets associated with coarse grain slots. A packet can be associated with a coarse grain slot if its transmit time is further in the future than the available lists for small granularity time increment slots. A packet allocated to a list with coarse grain slots can be associated with a list with small granularity time increment slot list at a time offset from its transmit time. A packet transmit time can indicates a minimum delay value before transmission and an actual transmit time can be a window around the packet transmit time. A packet may be stored in a queue prior to transmission and at or near packet transmission time, transmission of the packet may be delayed due to congestion or transmission of a higher priority or quality of service (QoS) packet.

Figure 1:
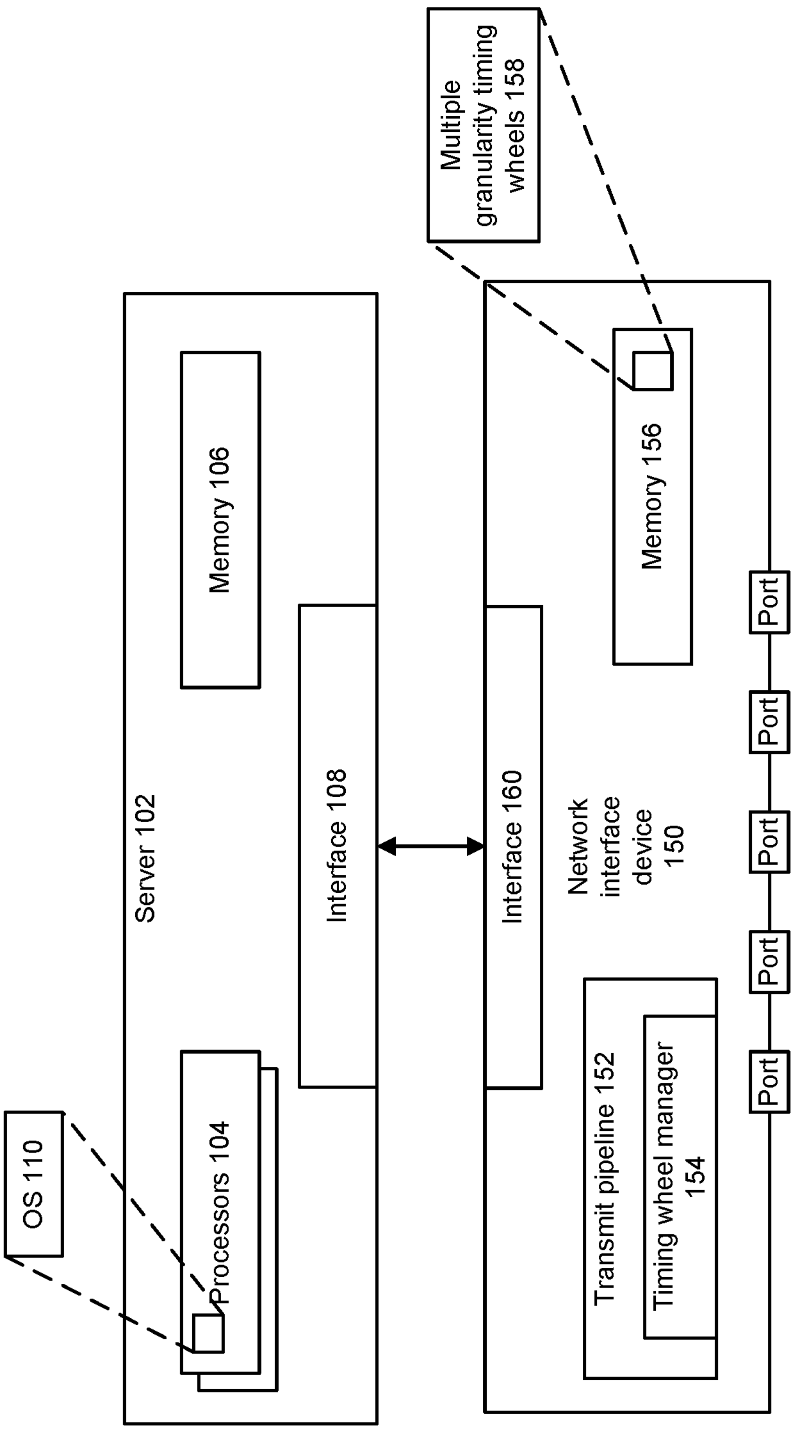
FIG. 1 depicts an example system.

FIG. 1 depicts an example system. Server 102 can include or access one or more processors 104, memory 106, and device interface 108, among other components described herein (e.g., accelerator devices, interconnects, and other circuitry). Processors 104 can execute one or more microservices, virtual machines (VMs), containers, or other distributed or virtualized execution environment that utilize or request paced transmission of packets using transport technologies such as Transmission Control Protocol (TCP), User Datagram Protocol (UDP), quick UDP Internet Connections (QUIC), RDMA over Converged Ethernet (RoCE), or other protocols. In some examples, one or more processors 104 can request network interface device 150 to transmit one or more packets and utilize packet transmission scheduling and shaping described herein. In some examples, allocating packets to a packet transmission timing list can be offloaded from one or more of processors 104 to network interface device 150. For example, operating system (OS) 110 or a driver, not shown, can enable or disable offloading allocating packets to a packet transmission timing wheel or list, as described herein. In some examples, an option can be provided to choose between use of multiple granularity timing wheels 158, or a hierarchical tree-based scheduler. Use of multiple granularity timing wheels 158 and information on operation of multiple granularity timing wheels 158 can be provided using application program interfaces (APIs), telemetry data, or other technologies.

In some examples, offload of a timing wheel or list management to network interface device 150 is independent of whether a policer stage is offloaded to network interface device 150 or performed by processor-executed software. A policing operation can include dropping packets of a flow with rates that are greater than a traffic policing rate.

A flow can be a sequence of packets being transferred between two endpoints, generally representing a single session using a known protocol. Accordingly, a flow can be identified by a set of defined tuples and, for routing purpose, a flow is identified by the two tuples that identify the endpoints, e.g., the source and destination addresses. For content-based services (e.g., load balancer, firewall, intrusion detection system, etc.), flows can be discriminated at a finer granularity by using N-tuples (e.g., source address, destination address, IP protocol, transport layer source port, and destination port). A packet in a flow is expected to have the same set of tuples in the packet header. A packet flow to be controlled can be identified by a combination of tuples (e.g., Ethernet type field, source and/or destination IP address, source and/or destination User Datagram Protocol (UDP) ports, source/destination TCP ports, or any other header field) and a unique source and destination queue pair (QP) number or identifier.

A packet may be used herein to refer to various formatted collections of bits that may be sent across a network, such as Ethernet frames, IP packets, TCP segments, UDP datagrams, etc. Also, as used in this document, references to L2, L3, L4, and L7 layers (layer 2, layer 3, layer 4, and layer 7) are references respectively to the second data link layer, the third network layer, the fourth transport layer, and the seventh application layer of the OSI (Open System Interconnection) layer model.

Network interface device 150 can be implemented as one or more of: a network interface controller (NIC), a remote direct memory access (RDMA)-enabled NIC, SmartNIC, router, switch, forwarding element, infrastructure processing unit (IPU), or data processing unit (DPU). Network interface device 150 can be communicatively coupled to interface 108 of server 102 using interface 160. Interface 108 and interface 160 can communicate based on Peripheral Component Interconnect Express (PCIe), Compute Express Link (CXL). See, for example, Peripheral Component Interconnect Express (PCIe) Base Specification 1.0 (2002), as well as earlier versions, later versions, and variations thereof. See, for example, Compute Express Link (CXL) Specification revision 2.0, version 0.7 (2019), as well as earlier versions, later versions, and variations thereof.

A transmit pipeline 152 can provide for packet transmission through one or more ports. In some examples, timing wheel manager 154 can assign packets transmission times in a list or wheel among multiple granularity timing wheels 158 stored in memory 156. Memory 156 can be implemented as a volatile memory device including a cache (e.g., Level 1 (L1), Level 2 (L2), Level 3 (L3), and/or last level cache (LLC)). Note that while memory 156 is shown as part of network interface device 150, memory 156 can be part of server 102 or another device.

Timing wheels 158 can include one or more linked lists that store identifiers or metadata of egress packets ordered based on their transmission timestamps. In some examples, egress packets whose transmission rate is not paced may not be identified in timing wheels 158. Transmit pipeline 152 can select packets in timing wheel 158 for transmission based on a packet timestamp. The timestamp can represent an earliest departure time of the packet, and use of timing wheels 158 can help ensure that packets are not transmitted until a timer value is greater than or equal to a packet's timestamp. Timing wheel manager 154 can select a slot in timing wheel 158 based on a packet's timestamp by either rounding up or down a timestamp value into a next slot.

To reduce the total number of time slots that need to be allocated in memory 156, timing wheel 158 can include multiple timing wheels of different time slot granularity. For example, when timing wheel 158 includes at least one coarse wheel or list and at least one fine grain wheel or list. In some examples, a fine granularity list corresponds to a transmit time window that is within X seconds of a current transmit time and a coarse granularity list corresponds to a transmit time window that is outside of X seconds of the current transmit time. Note that although two levels of granularity are described, three or more levels of granularity can be used such as fine (smallest time slot), coarse (largest time slot), and medium (time slot size between smallest and largest).

For example, if the desired multi-granular timing wheel configuration is 2 microsecond time slot with a 512 millisecond (ms) packet transmit time or delay horizon, the fine-grained wheel can be configured with a 2 microsecond width time slot and the coarse-grained wheel is configured with 512 time slots of 1024 microsecond (approximately 1 millisecond) width granularity. By contrast, a dual-wheel timing wheel configuration example can be used to manage a 512 ms packet transmission time horizon with 2 microsecond time slots with significantly fewer time slots than a single wheel or list implementation with approximately 256,000 2 microsecond time slots.

In some examples, header and tail pointers for each list can be stored in memory 156 as timing wheels 158 and data in the linked lists (e.g., packet meta data) can be stored in memory 156 or memory 106, or other memory device. Accordingly, a number of stored head and tail pointers can be reduced by use of fine and coarse grain wheels or lists as there are fewer lists to store than if merely fine grain time slot wheels are used.

Figure 2:
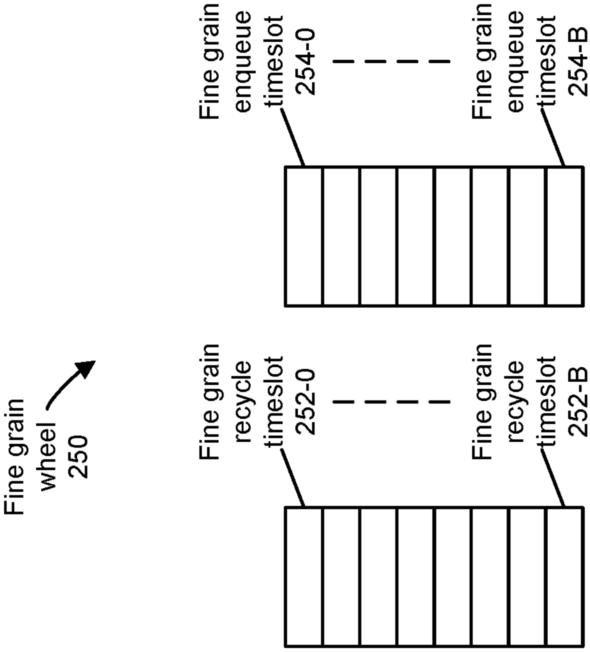
FIG. 2 depicts an example of timing wheels.
Figure 2:
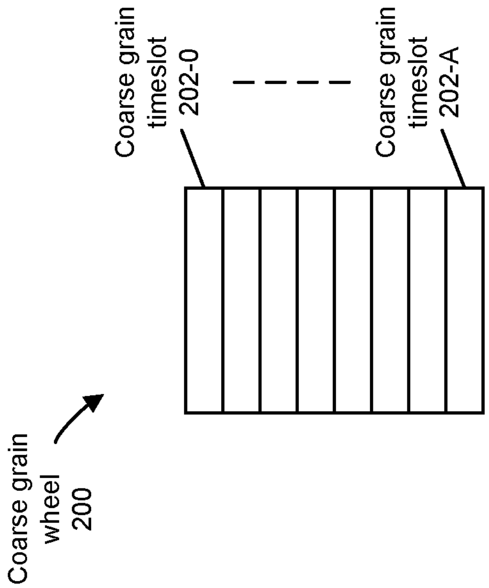

FIG. 2 depicts an example of timing wheels. Coarse grained timing wheel 200 can include one or more coarse grained time slots 202-0 to 202-A. Fine grained timing wheel 250 can include one or more fine grained recycle time slots 252-0 to 252-B and fine grained enqueue time slots 254-0 to 254-B. Although one fine grain timing wheel 250 is shown, multiple fine grain timing wheels can be used. Each of coarse grained time slots 202-0 to 202-A can represent larger time windows than those of fine grained time slots 252-0 to 252-B. Packets scheduled for transmission in a window of time for a fine grain slot can be enqueued in a fine grain set. For packets scheduled in enqueue time slots 254-0 to 254-B, no recycling from higher granularity slot to lower granularity slots is performed.

Instead of using lists for only smaller granularity time increment slots, some examples provide slots close in time to dequeue time and for packets dequeued later in time, slots that are in bigger granularity (coarse grain slots). Finer grained lists can be used to identify packets of a coarse grain list and the finer grained lists can be reused, to limit a total number of lists and head and tail pointers to respective link list head and tail locations in memory that are stored. Packets to be transmitted later in time can be stored in larger time increment (coarse grain) slots so that fewer slots and corresponding packet transmit lists are used for a packet transmit time horizon. A packet can be disassociated with a coarse grain slot and associated with a finer grain set closer in time to transmission by use of a recycle fine grain set. Packet entries can be fetched from a coarse grain link list to recycle the packet entries into their respective fine grain slots for dequeue. A finer grain set can have a enqueue set and recycle set of queues. In some examples, when current time is close to a coarse grain slot, memory access pattern contains high numbers of reads and writes in connection with packet recycling.

Packet metadata can be associated with a packet and stored in a linked list. Metadata information carried through the timing wheel can include one or more of: packet transmission timestamp, port identifier (ID), host identifier (HostID), Traffic Class, Function, virtual server instance (VSI)/virtual machine (VM) identifiers (IDs), cryptography related information (e.g., encryption or decryption key), scatter gather list (SGL) pointers in host memory, information to support flows such as loopback, large segment offloads (LSO), non-volatile memory express (NVMe), remote direct memory access (RDMA) over Converged Ethernet (RoCE), and so forth.

Figure 3:
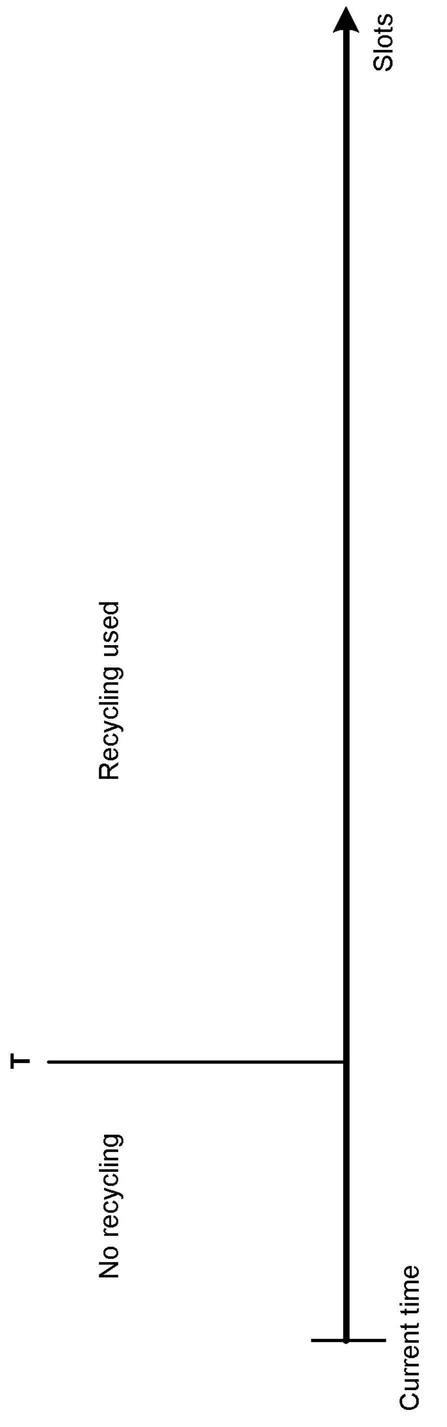
FIG. 3 depicts an example of recycling of packets from coarse grain slots to fine grain slots.

FIG. 3 depicts an example of recycling of packets from coarse grain slots to fine grain slots. For packet transmit times scheduled after a threshold time T, packets from coarse grain slots can be recycled or copied to the corresponding set of fine grain slots in recycle fine grain pool. For packet transmit times scheduled at or before a threshold time T, packets can be allocated in corresponding set of fine grain slots in enqueue fine grain pool.

Figure 4:
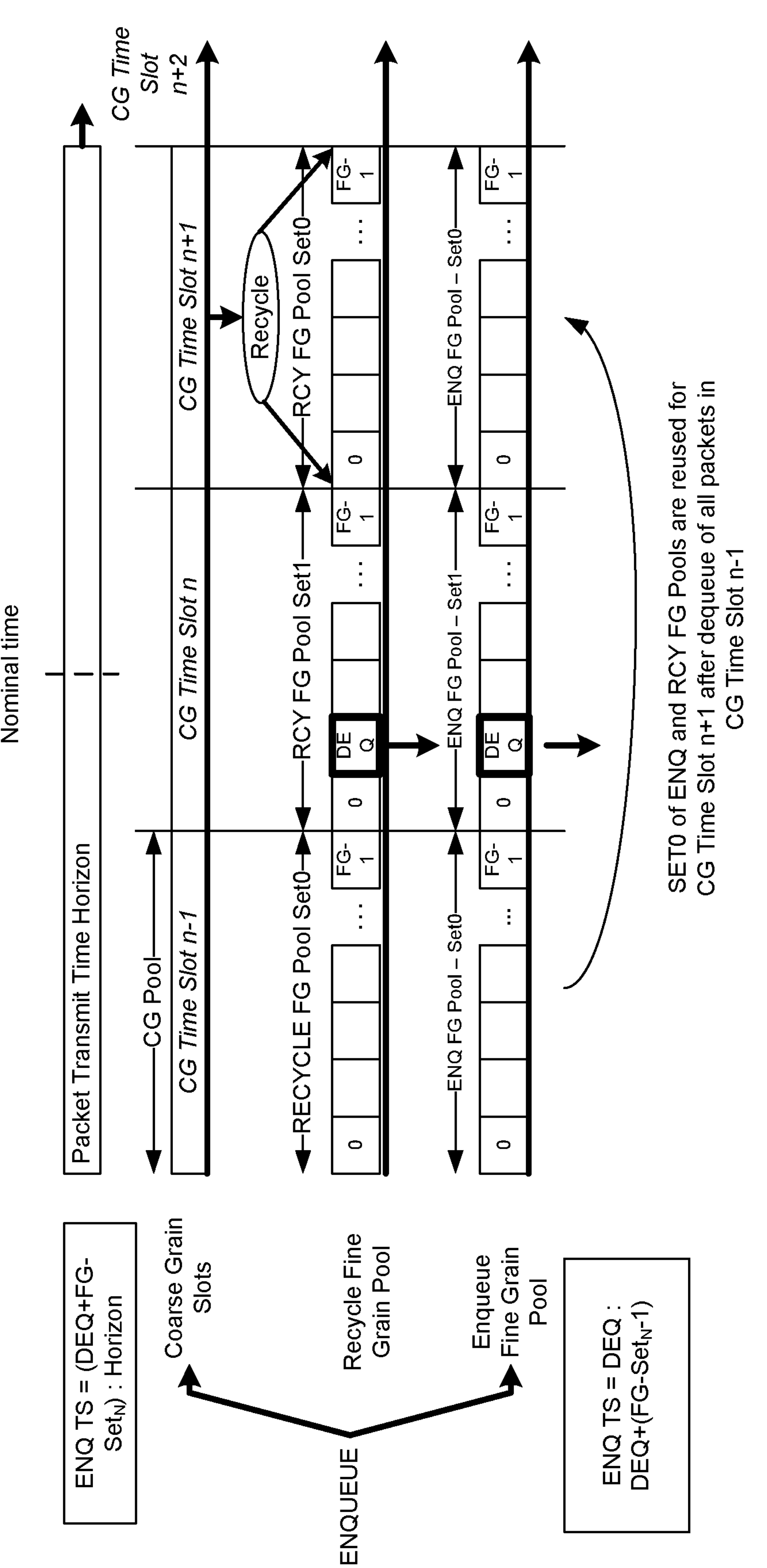
FIG. 4 depicts an example of use of two level multi granular timing wheels.

FIG. 4 depicts an example of use of two level multi granular timing wheels. In some examples, two fine grained reusable sets in each of recycle fine grain pool and enqueue fine grain pool are available for use and reuse. However, other numbers of fine grained reusable sets can be used such as one or three or more. For example, Set0 of RECYCLE FG Pool could be used to recycle or identify packets formerly associated with coarse grain (CG) TimeSlot n−1 whereas Set1 of RECYCLE (RCY) FG Pool could be used to recycle or identify packets formerly associated with CG time slot n. FG sets can stack link lists with packets from multiple CG slots up-to the Nominal time.

For example, a Nominal Time (Nom) can represent a time based on a primary timer in a host device, network interface, or separate from the host device and network interface. A Dequeue Time Slot (DEQ or $DEQ_{TS}$) can represent a fine-grained time slot from which the packets are dequeued and selected for transmission. A Dequeue Time can represent an earliest time value that can exist in the Current Transmit Time Slot. A Recycle Time Slot ($RCY_{TS}$) can represent a coarse-grained time slot from which the Timing Wheel is recycling. A Recycle Time can represent an earliest time value that can exist in the Current Recycle Time Slot. A Packet Transmit Time Horizon can represent a total time window covered by the window.

In some examples, a fine grain set (FG-Set) can include $FG_N$ number of FG time slots that make up a single CG time slot. $FG\text{-}Set_N$ number of fine grain sets can be available and in this example, $FG\text{-}Set_N=2$. A fine grain slot ($FG_{TS}$) can be of DEQ time granularity ($DEQ_{GRAN}$). The fine-grained timing wheel (FGTW) can be of DEQ time granularity. Accordingly, a coarse grain time slot ($CG_{TS}$) granularity can be $FG_N \times DEQ_{GRAN}$. The coarse-grained timing wheel (CGTW) can implement $CG_N$ number of time slots of coarse grain granularity up to the time horizon of the timing wheel.

Packet metadata can be enqueued into the fine-grained timing wheel if its timestamp is less than or equal to ($FG\text{-}Set_N-1$) time window from dequeue time. Packet metadata can be enqueued into a coarse-grained time slot wheel if an associated timestamp is greater than the end of the time window of ($FG\text{-}Set_N-1$). Packets with associated timestamps that are farther than the horizon can be dropped or put in the last timeslot of the horizon. Packets that arrive with a timestamp that is before the current nominal time can be put in its corresponding slot of a set in enqueue fine grain pool if slot time has not expired or put into the current nominal timeslot.

As time advances and coarse-grained time slots become close to current nominal time, packet metadata can be moved from a coarse-grained time slot to a fine-grained time slot of a recycle fine-grained set. The multiple granularity timing wheel can begin recycling a coarse-grained slot that starts from Dequeue Time Slot up until the coarse-grained time slot at current nominal time. Packets scheduled at coarse-grained slots can be recycled ahead of their departure time, with a (nominal time in CG granularity−Dequeue time in CG granularity) head-start. A traffic shaper of a network interface device can move packet metadata from a time slot on the coarse-grained timing wheel into a corresponding finer grain time slot on the RCY FG-Pool based on the original timestamp of the packet.

In some examples, there are two types of FG-Pools, namely an ENQ FG-Pool and RECYCLE FG-Pool. Each pool can contain a number of FG sets. When a CG slot is recycled to a FG set in RECYCLE FG-Pool, that CG slot ($RCY_{TS}$) can be locked from receiving any additional new packets to have a deterministic number of packets in the CG pool to recycle. However, when the CG slot being recycled is at nominal slot, then new packets can continue to be accepted into that CG slot while being recycled. New packets received with transmit timestamps within a time range associated with a fine grain set can be enqueued into a separate enqueue (ENQ) FG-Pool.

A dequeue time slot can be a first FG time slot from which packets are to be transmitted. Packets in the Dequeue Time Slot can be read from the timing wheel and dequeued out of the timing wheel to a downstream transmit pipeline. One or more packets associated with a current dequeue time slot (DEQ) can be dequeued. A Dequeue Time Slot can be refer to both an enqueue FG slot and a recycle FG slot. Dequeue can occur for packet(s) from the recycle FG slot followed by packet(s) associated with the enqueue FG slot to provide for packet transmit in order of requests to transmit packets.

For example, for a 512 millisecond time horizon with 2 microsecond time stamp granularity, implementing a timing wheel for packet pacing to cover a large time horizon of packet timestamps while dequeuing packets with time precision of 2 microseconds for a 512 millisecond time horizon timing wheel with a 2 microsecond dequeue granularity would require link lists with 256,000 slots. By contrast, use of a two level multi granular timing wheels with two sets of fine grain slots in each of enqueue and recycle fine grain pool can utilize approximately 2500-3000 slots.

The following provides an example of reuse of fine grained sets. For example, for 24 minutes of tracking at 1 minute granularity, 24 coarse grained lists for each minute can be maintained. A head pointer and tail pointer for each list can be stored in memory accessible to a scheduler in a network interface device. For 2 fine grain sets of 1 minute duration with 5 second increments, there is 1 list of packet(s) per 5 second increment, or 12 lists per minute. For recycle and enqueue lists, there are 12*2*2=48 lists. After adding 24 coarse grain lists, some examples use 72 lists. By contrast, having 24 minutes of tracking with fine grain lists with 1 list per 5 second increment provides 24*12=288 lists, which is many more lists than when mixed fine and coarse granularity lists are used.

For a timing wheel that starts at (minute, second) of (8, 15), a dequeue slot is initialized to (minute, second)=(8, 15). Packets scheduled at minutes 8 and 9 can be scheduled directly at a 5 second slot of their corresponding set, where minute=8 uses set 0 and minute=9 uses set 1 in enqueue fine-grained pool. Packets scheduled at minute=10 and after are scheduled at their minute-slot in enqueue coarse-grained pool.

At enqueue, 4 packets are scheduled at (minute, second)=(8,15), (9,25), (10,35) and (11,45). The packet scheduled at (minute, second)=(8, 15) is scheduled at 5 second-slot 3 of set 0 in an enqueue fine-grained pool. The packet scheduled at (minute, second)=(9, 25) is scheduled at 5 second-slot 5 of set 1 in an enqueue fine-grained pool. The packet scheduled at (minute, second)=(10, 35) is scheduled at minute CG slot 10. The packet scheduled at (minute, second)=(11, 345) is scheduled at minute CG slot 11.

When dequeue corresponds to slot of (minute, second)=(8, 15), the packet metadata can be dequeued from the 5 second slot (slot 3) of set 0 of the enqueue fine-grained pool for transmission. A packet can be formed based on the packet metadata for transmission at the slot of (minute, second)=(8, 15). When dequeue corresponds with slot of (minute, second)=(9, 25), the packet metadata can be dequeued from the 5 second slot (slot 5) of set 1 of the enqueue fine-grained pool for transmission. A packet can be formed based on the packet metadata for transmission at the slot of (minute, second)=(9, 25). The packet scheduled at (minute, second)=(10, 35) into minute CG slot 10 can now be recycled and scheduled at a 5 second slot (slot 7) of set 0 in recycle fine-grained pool. Such packet can be dequeued from 5 second slot (slot 7) of set 0 in recycle fine-grained pool for transmission and a packet can be formed based on the packet metadata for transmission at the slot of (minute, second)=(10, 35).

The packet scheduled at (minute, second)=(11, 45) into minute CG slot 11 can now be recycled and scheduled at a 5 second slot (slot 9) of set 1 in recycle fine-grained pool. The packet can be dequeued from 5 second slot (slot 9) of set 1 in recycle fine-grained pool for transmission and a packet can be formed based on the packet metadata for transmission at the slot of (minute, second)=(11, 45).

Referring to FIG. 4, DEQ boxes can represent a current time slot from which packets are dequeued. In some cases, dequeue drift can occur whereby a DEQ can lag a current (nominal) time, for example due to delays in transmitting packets from a DEQ slot arising from congestion, insufficient packet memory bandwidth, dequeue bursts, or other processing delays. Some examples use a fine grain time slot to refer to packets in multiple, different and non-consecutive, CG slot time windows to allow fine grained packet transmission scheduling despite dequeue drift. Slot link list stacking for time slots can occur to allow recycling of packets to continue up to the nominal time even in the presence of dequeue drift so that coarse grain slots up to nominal can be recycled and ready for dequeue to recover drift.

Figure 5:
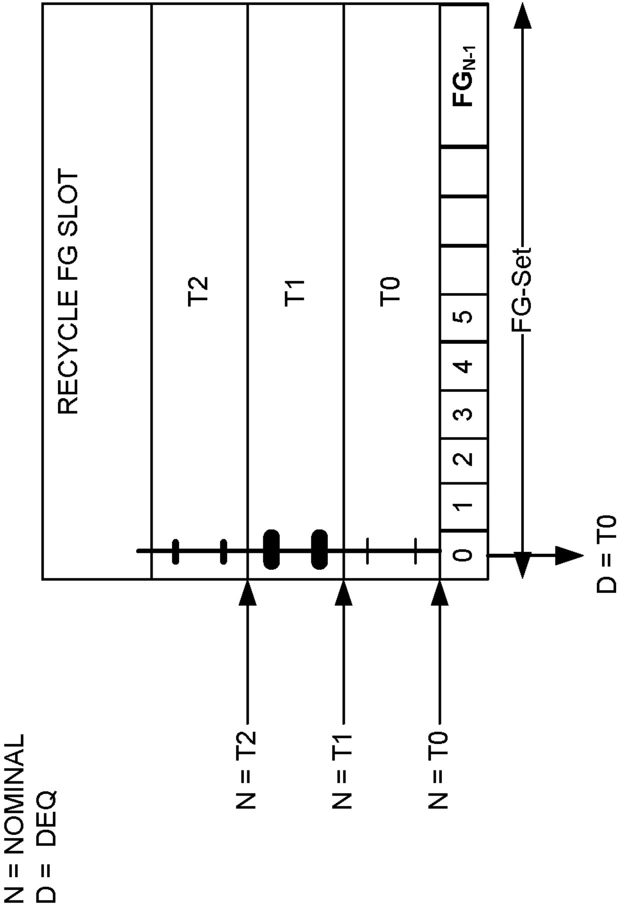
FIG. 5 depicts an example of stacking of packets into fine grained time slots.

In some cases, a fine grained recycle time slot can refer to packets in multiple time windows. FIG. 5 depicts an example where packets of time windows T0, T1, and T2 are associated with a fine grained (FG) time slot of 0. Time window T0 can refer to a coarse time window T0, time window T1 can refer to a coarse grained time window T1, and time window T2 can refer to a coarse time window T2. To expand a fine grained recycle time slot to refer to packets in multiple time windows, for a particular fine grained recycle time slot, a linked list of packet meta data can be expanded to encompass metadata for packets associated with time windows T0 to T2. A single header pointer and a single tail pointer can identify a respective head and tail of a linked list for each fine grained recycled time slot despite a linked list potentially growing in size. In some examples, packets of a coarse grained time window can be included in a time window of a fine grained without waiting for an available fine grained set. In some examples, packets of a coarse grained time window can be copied to a fine grained after availability of a fine grained set.

For example, a fine grained set assigned for use by packets of a coarse grained time window can be determined as a [CG-Slot$_i$ modulo N], where CG-Slot$_i$ indicates a time slot number of a coarse grained window and N represents a number of fine grained sets.

In some examples, at least one of the $FG_{TS}$ time slot link list within the FG-Pools can have packets from multiple CG time slots and multiple time horizons or windows.

Packet dequeues can occur first for CG time T0. Packets for N=CG-T1:$FG_N$ can be stacked on to the same $FG_N$ link list that is currently holding packets from CG-T0 being dequeued. The CG slot ID can provide a delineation between packet information of the one CG slot versus a different CG time slot (e.g., T0, T1, or T2). For example, packet dequeue and transmission can occur for all packets in fine grained slots for T0, followed by packet dequeue and transmission for all packets in fine grained slots for T1, followed by packet dequeue and transmission for all packets in fine grained slots for T2.

Linked lists linking packet meta data to time slots of a fine grained or coarse grained slots can be formed in memory or cache and header and tail pointers can identify a start and end memory address of an element in a link list, with each element in the linked list referring to a memory address of a next element. A cache or memory device on a same die as that of the network interface device can store packet metadata in link lists corresponding to timing wheel slots. A hierarchical link list can be used where a parent link list refers to packet metadata information in each time slot and a child link list per packet holds pointers to the actual cache lines in a cache that store packet metadata information.

A transmit scheduler in a network interface device can utilize a timestamp-based eviction technology to evict from the cache packet metadata that belongs to a time slot that is furthest from the current nominal time. The eviction technology can attempt to keep packet metadata in the cache for which transmission time is the closest to nominal time. For example, at Packet Write (Enqueue), a buffer in memory along with a BufferID can be allocated. In case packet metadata is stored to a cache, the Buffer Pointer is stored with the packet metadata in the cache if the cache is not full. If the cache is full, timestamps for packet metadata stored in the cache can be checked. A packet metadata with the largest timestamp (furthest in the future) in the cache can be evicted to free space in the cache and the packet metadata can be written to the memory. Incoming packet metadata can be written into the freed space in the cache.

At Packet Read (Dequeue), a cache hit occurs if dequeue packet buffer ID matches the BufferID at the head of the dequeue slot in the cache. In case packet meta data is in the cache, packet meta data can be read from the cache. Otherwise, the packet meta data can be read from the memory.

Some examples of packet transmission scheduling using multiple time slot granularity lists can be used in connection with streaming of data, such as media data. Real-time Transport Protocol (RTP) can be used with Real-time Control Protocol (RTCP) for media stream delivery. RTP can be used to transmit the media stream (e.g., audio and/or video), whereas RTCP can be used to monitor transmission statistics and quality of service (QoS) and aids in the synchronization of audio and video streams. Other control protocols (signaling protocols) can be used such as International Telecommunication Union Telecommunication Standardization Sector (ITU-T) H.323, Session Initiation Protocol (SIP) or Jingle (XMPP). Packet formats can map MPEG-4 audio/video into RTP packets as specified in RFC 3016. Audio payload formats can include, but are not limited to, G.711, G.723, G.726, G.729, GSM, QCELP, MP3, and DTMF. Video payload formats can include, but are not limited to, H.261, H.263, H.264, H.265, and MPEG-1/MPEG-2. For example, some media streaming services use the Dynamic Streaming over HTTP (DASH) protocol or HTTP Live Streaming (HLS). Some streaming protocols allow for control of media playback, recording, or pausing to provide real-time control of media streaming from the server to a client such as video-on-demand (VOD) or media on demand.

Figure 6:
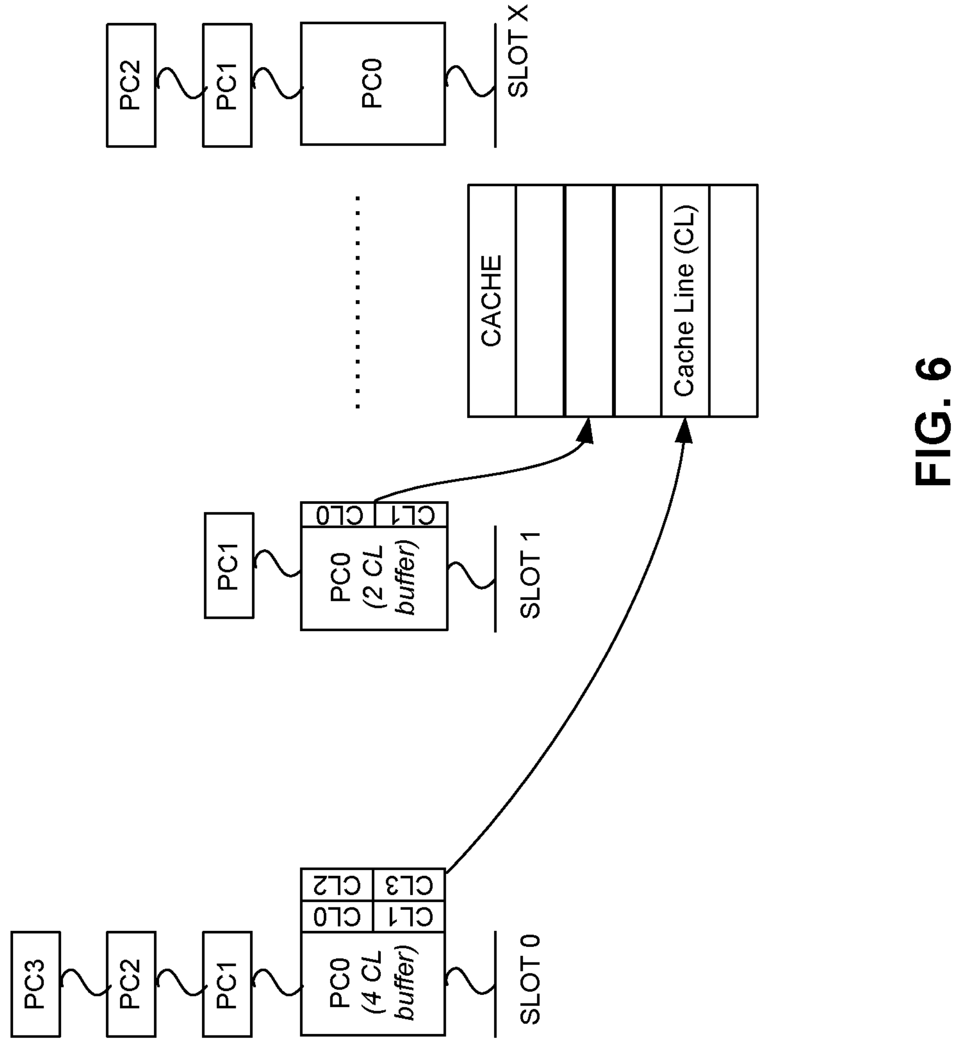
FIG. 6 depicts an example of caching of packet metadata.

FIG. 6 depicts an example cache implementation in which linked lists can be maintained. A transmit traffic manager in a network interface device can include or access a cache and the transmit traffic manager can perform cache eviction and pre-fetching. A linked list can maintain a subset of the packet metadata. Packet Context (PC) can refer to packet header and metadata that is stored in timing wheel link lists. In some examples, one or more PCs that are nearest to nominal time can be stored in a cache that is on-die with the network interface device to reduce access time to the PC. The one or more PCs can be pre-fetched into the cache in some examples based on the transmit time stamps of the one or more PCs that are closest to nominal time. Packet header and metadata associated with a PC can be stored in one or more Cache Lines (CLs) of the cache. Note that identifying packet metadata stored in the cache with a largest timestamp can be performed by reviewing the linked list and identifying a farthest time slot or timestamp in the future from a current time. Packet metadata associated with a linked list head, in case of a CG list, may not have the farthest or largest timestamp value.

Figure 7A:
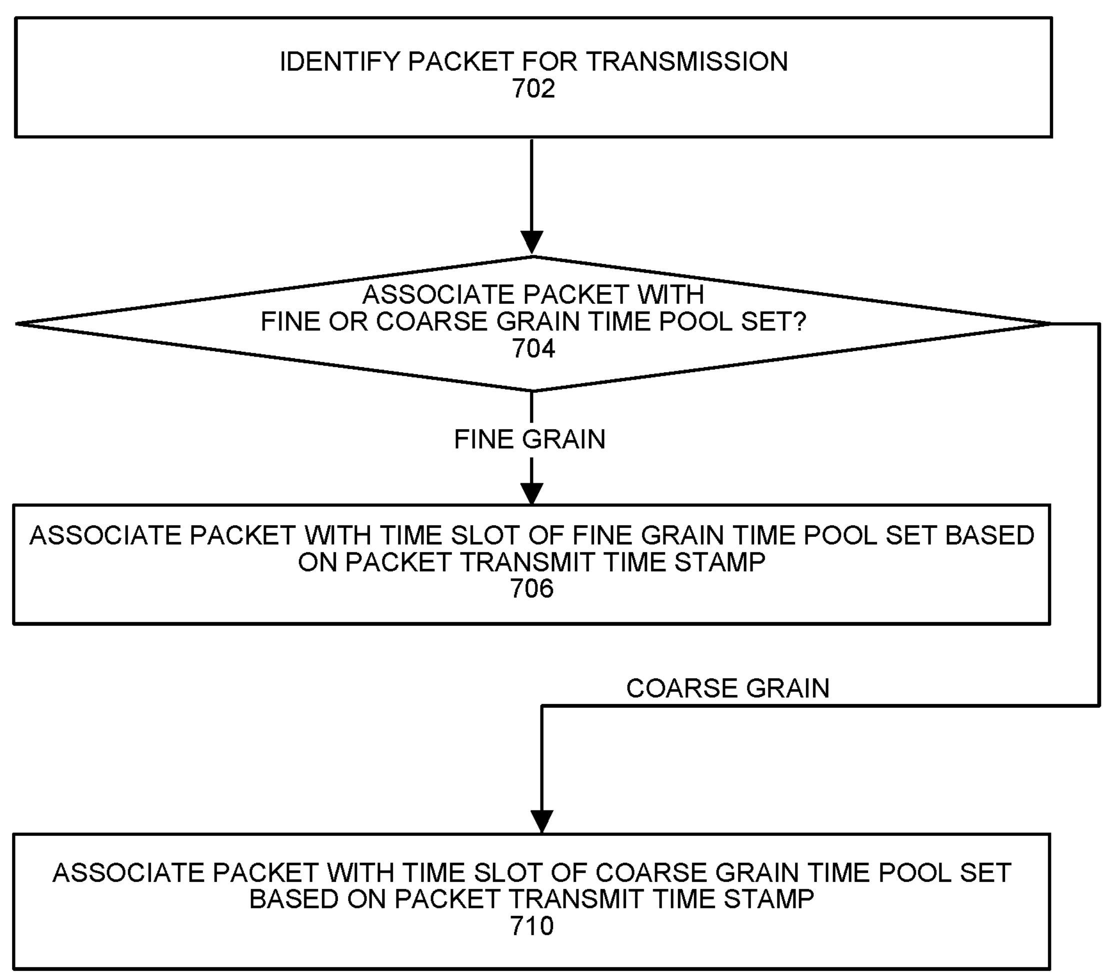
FIGS. 7A and 7B depict example processes.

FIG. 7A depicts an example process that can be used to associate packets with time slots in fine or coarse grained time pool sets. The process can be used in connection with packet transmission scheduling and shaping. Although not depicted, during association of packets with time slots in fine or coarse grained time pool sets, packets can be transmitted at or near (before or after) their prescribed transmit time stamp by use of time slots associated with a fine grained pool set. At 702, a packet transmission request can be received.

The packet transmission request can have associated metadata that specifies one or more of: packet transmission timestamp, Port identifier (ID), host identifier (HostID), Traffic Class, Function, virtual server instance (VSI)/virtual machine (VM) identifiers (IDs), cryptography related information (e.g., encryption or decryption key), scatter gather list (SGL) pointers in host memory, information to support flows such as loopback, large segment offloads (LSO), non-volatile memory express (NVMe), remote direct memory access (RDMA) over Converged Ethernet (RoCE), and so forth. At 704, a determination can be made if the packet is to be associated with a coarse grain time pool set or a fine grain time pool set based on a number M of fine grain time pool sets are available for use. For example, a fine grain time pool set can be used to identify a time window of packets at a finer granularity than that of the coarse grain time pool set. In some examples, a packet can be associated with (a) a fine grain time pool set if a transmit time stamp of the packet is less than or equal to [M*time window of fine grain time pool set] from a current time or (b) a coarse grain time pool set if a transmit time stamp of the packet is more than [M*time window of fine grain time pool set] from a current time. If the packet is to be associated with a fine grain time pool set, the process can proceed to 706. If the packet is to be associated with a coarse grain time pool set, the process can proceed to 710.

At 706, the packet can be assigned to a time slot of a fine grain time pool set. For example, the packet is assigned to one of the M fine grain time pool sets having a window of time that encompasses the packet's transmit time stamp. In some examples, the packet metadata can be assigned to a time slot of an enqueue slot of a fine grain pool set.

At 710, the packet metadata can be assigned to a time slot of a coarse grained time pool set associated with a time window that encompasses the packet's transmit time stamp.

Figure 7B:
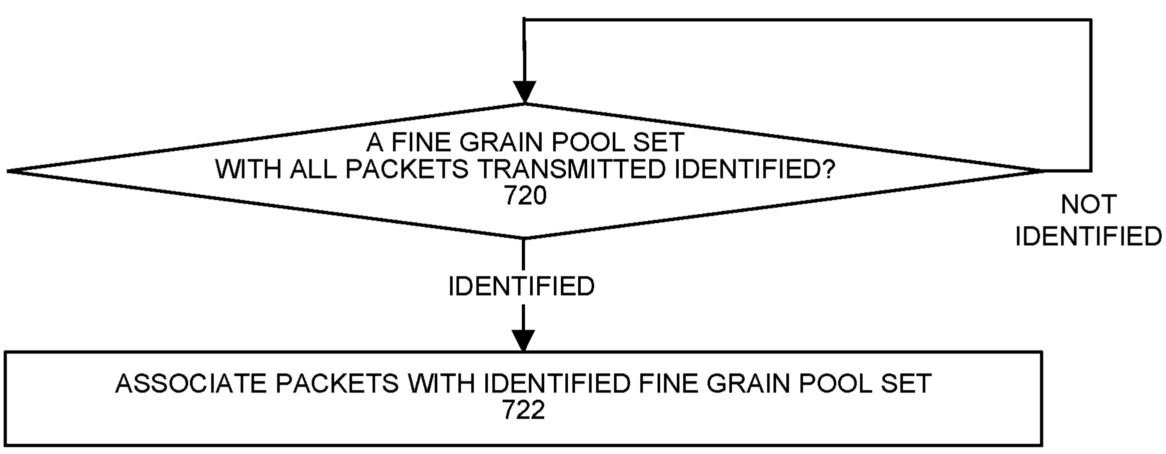

FIG. 7B depicts an example process that can be used to allocate a fine grain time pool set for a coarse grained time pool set. The process can be used in connection with packet transmission scheduling and shaping. Although not depicted, during association of packets with time slots in fine or coarse grained time pool sets, packets can be transmitted at or near their prescribed transmit time stamp by use of time slots associated with a fine grained pool set. At 720, a determination can be made if all packets associated with one of the M fine grain time pool sets have been transmitted. If all packets associated with one of the M fine grain time pool sets have been transmitted, such identified fine grain time pool set can be allocated for packets associated with a coarse grain time pool set associated with no fine grain time pool set. If all packets associated with one of the M fine grain time pool sets have been transmitted, then the process can continue to 722. If all packets associated with one of the M fine grain time pool sets have not been transmitted, then 720 can repeat.

At 722, the identified one of the M fine grain time pool sets can be utilized for packets of a coarse grain pool set identified to have no associated fine grain time pool set. For example, a recycle set of the identified fine grain pool set can be used to identify packets for transmission in finer grained time slots than that of the coarse grain pool set. Note that in some examples, the identified one of the M fine grain time pool sets need not have had all of its packets transmitted but instead, slot link list stacking for time slots can be utilized as described herein.

Figure 8:
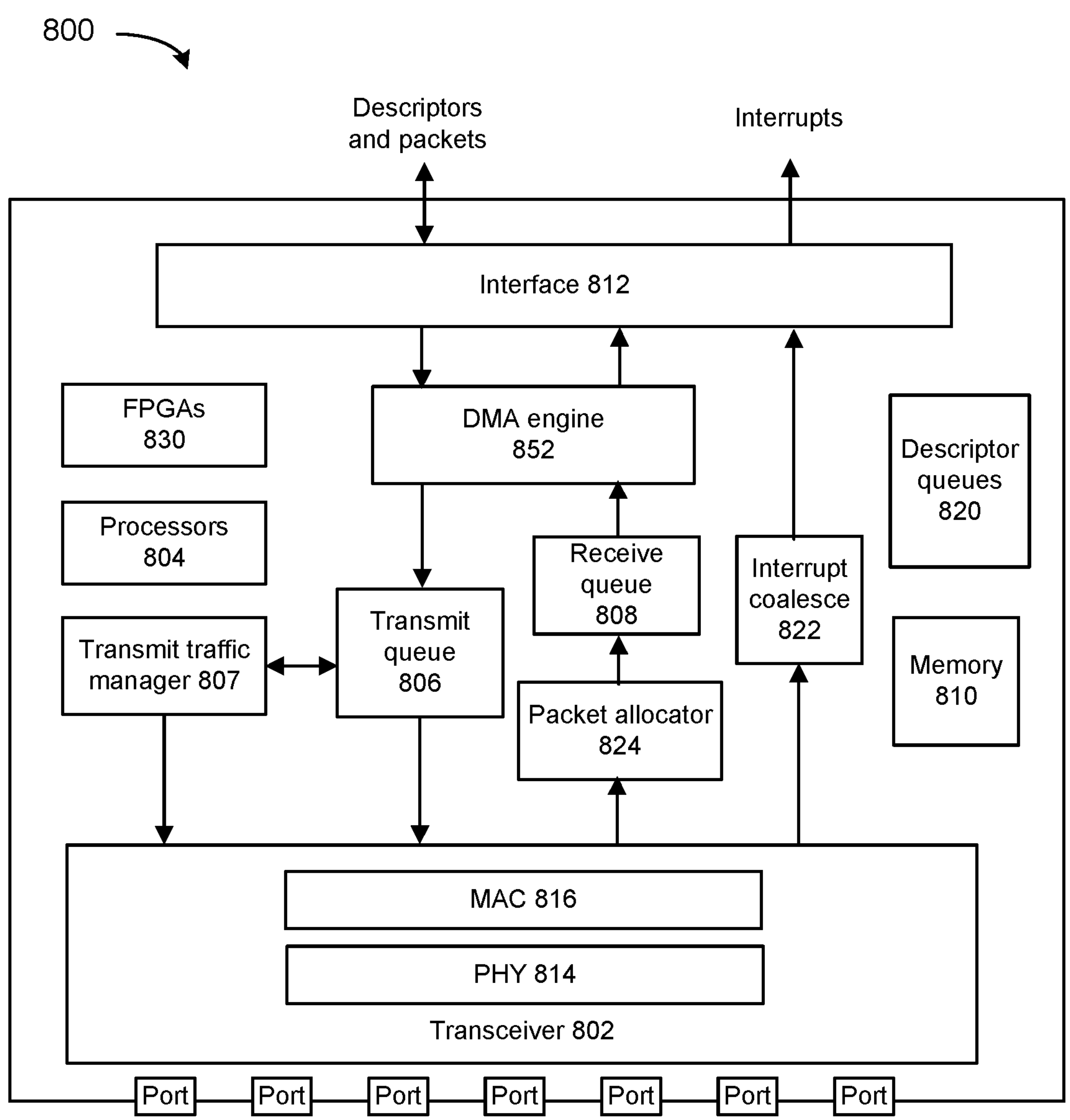
FIG. 8 depicts an example network interface device.

FIG. 8 depicts an example network interface. Various processor resources in the network interface can perform allocation of a packet for transmission to a fine or coarse grain pool set in connection with packet transmission scheduling and shaping, as described herein. In some examples, network interface 800 can be implemented as a network interface controller, network interface card, a host fabric interface (HFI), or host bus adapter (HBA), and such examples can be interchangeable. Network interface 800 can be coupled to one or more servers using a bus, PCIe, CXL, or DDR. Network interface 800 may be embodied as part of a system-on-a-chip (SoC) that includes one or more processors, or included on a multichip package that also contains one or more processors.

Some examples of network device 800 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Network interface 800 can include transceiver 802, processors 804, transmit queue 806, receive queue 808, memory 810, and bus interface 812, and DMA engine 852. Transceiver 802 can be capable of receiving and transmitting packets in conformance with the applicable protocols such as Ethernet as described in IEEE 802.3, although other protocols may be used. Transceiver 802 can receive and transmit packets from and to a network via a network medium (not depicted). Transceiver 802 can include PHY circuitry 814 and media access control (MAC) circuitry 816. PHY circuitry 814 can include encoding and decoding circuitry (not shown) to encode and decode data packets according to applicable physical layer specifications or standards. MAC circuitry 816 can be configured to perform MAC address filtering on received packets, process MAC headers of received packets by verifying data integrity, remove preambles and padding, and provide packet content for processing by higher layers. MAC circuitry 816 can be configured to assemble data to be transmitted into packets, that include destination and source addresses along with network control information and error detection hash values.

For packets that are enqueued for transmission in transmit queue 806, transmit traffic manager 807 can perform performs the transmit scheduling, fine and coarse grain list management and migration, stacking, and cache eviction, as described herein.

Processors 804 can be any a combination of: a processor, core, graphics processing unit (GPU), field programmable gate array (FPGA), application specific integrated circuit (ASIC), or other programmable hardware device that allow programming of network interface 800. For example, a "smart network interface" or SmartNIC can provide packet processing capabilities in the network interface using processors 804.

Processors 804 can include a programmable processing pipeline that is programmable by P4, C, Python, Broadcom Network Programming Language (NPL), or x86 compatible executable binaries or other executable binaries. A programmable processing pipeline can include one or more match-action units (MAUs) that can schedule packets for transmission using one or multiple granularity lists, as described herein. Processors, FPGAs, other specialized processors, controllers, devices, and/or circuits can be used utilized for packet processing or packet modification. Ternary content-addressable memory (TCAM) can be used for parallel match-action or look-up operations on packet header content.

Packet allocator 824 can provide distribution of received packets for processing by multiple CPUs or cores using receive side scaling (RSS). When packet allocator 824 uses RSS, packet allocator 824 can calculate a hash or make another determination based on contents of a received packet to determine which CPU or core is to process a packet.

Interrupt coalesce 822 can perform interrupt moderation whereby network interface interrupt coalesce 822 waits for multiple packets to arrive, or for a time-out to expire, before generating an interrupt to host system to process received packet(s). Receive Segment Coalescing (RSC) can be performed by network interface 800 whereby portions of incoming packets are combined into segments of a packet. Network interface 800 provides this coalesced packet to an application.

Direct memory access (DMA) engine 852 can copy a packet header, packet payload, and/or descriptor directly from host memory to the network interface or vice versa, instead of copying the packet to an intermediate buffer at the host and then using another copy operation from the intermediate buffer to the destination buffer.

Memory 810 can be any type of volatile or non-volatile memory device and can store any queue or instructions used to program network interface 800. Transmit queue 806 can include data or references to data for transmission by network interface. Receive queue 808 can include data or references to data that was received by network interface from a network. Descriptor queues 820 can include descriptors that reference data or packets in transmit queue 806 or receive queue 808. Bus interface 812 can provide an interface with host device (not depicted). For example, bus interface 812 can be compatible with or based at least in part on PCI, PCI Express, PCI-x, Serial ATA, and/or USB (although other interconnection standards may be used), or proprietary variations thereof.

Figure 9:
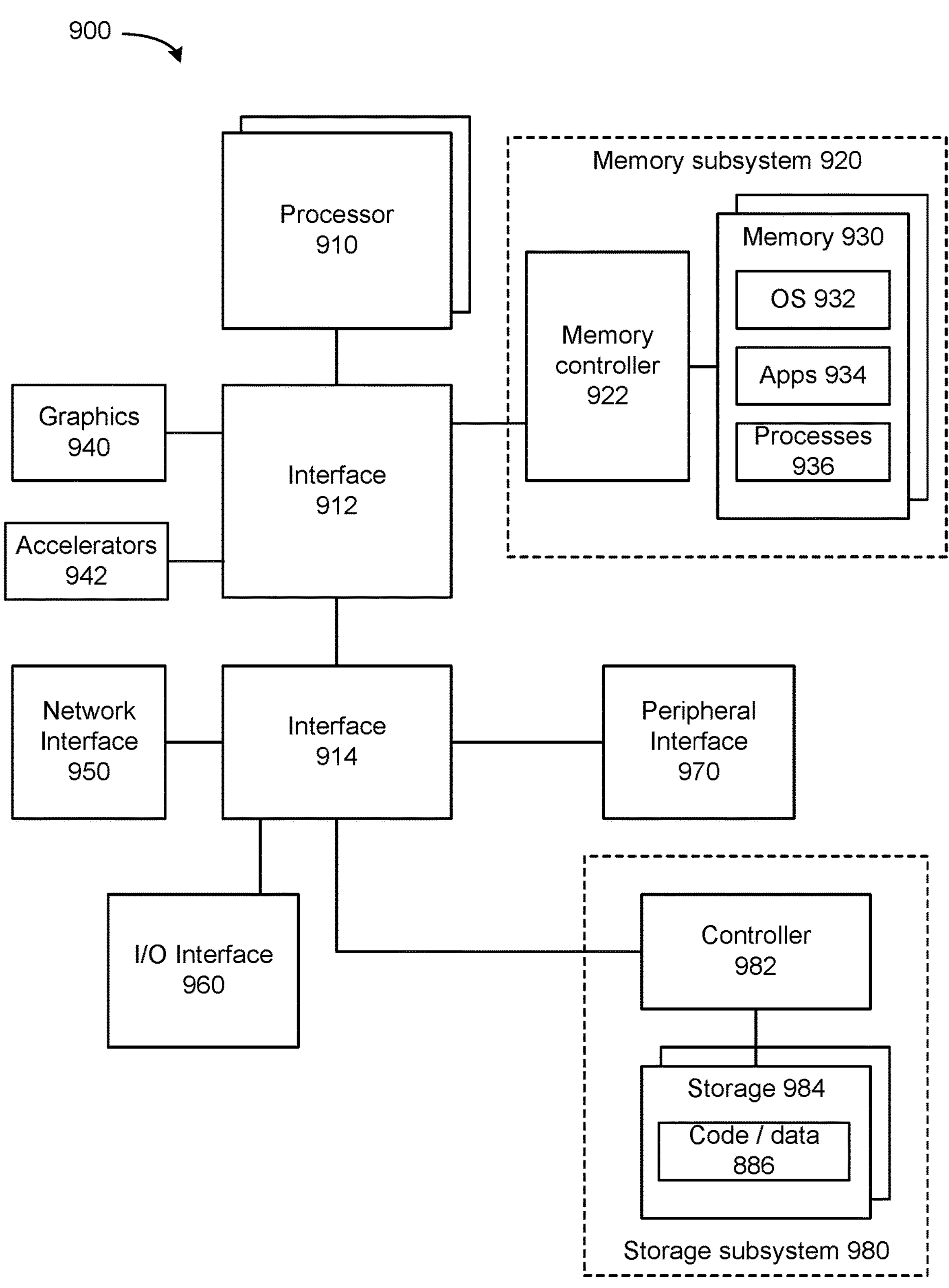
FIG. 9 depicts a system.

FIG. 9 depicts an example computing system. Components of system 900 (e.g., processor 910, network interface 950, and so forth) to schedule packets for transmission using one or multiple granularity lists, as described herein. System 900 includes processor 910, which provides processing, operation management, and execution of instructions for system 900. Processor 910 can include any type of microprocessor, central processing unit (CPU), graphics processing unit (GPU), processing core, or other processing hardware to provide processing for system 900, or a combination of processors. Processor 910 controls the overall operation of system 900, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 900 includes interface 912 coupled to processor 910, which can represent a higher speed interface or a high throughput interface for system components that needs higher bandwidth connections, such as memory subsystem 920 or graphics interface components 940, or accelerators 942. Interface 912 represents an interface circuit, which can be a standalone component or integrated onto a processor die. Where present, graphics interface 940 interfaces to graphics components for providing a visual display to a user of system 900. In one example, graphics interface 940 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 940 generates a display based on data stored in memory 930 or based on operations executed by processor 910 or both. In one example, graphics interface 940 generates a display based on data stored in memory 930 or based on operations executed by processor 910 or both.

Accelerators 942 can be a fixed function or programmable offload engine that can be accessed or used by a processor 910. For example, an accelerator among accelerators 942 can provide compression (DC) capability, cryptography services such as public key encryption (PKE), cipher, hash/authentication capabilities, decryption, or other capabilities or services. In some embodiments, in addition or alternatively, an accelerator among accelerators 942 provides field select controller capabilities as described herein. In some cases, accelerators 942 can be integrated into a CPU socket (e.g., a connector to a motherboard or circuit board that includes a CPU and provides an electrical interface with the CPU). For example, accelerators 942 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 942 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 920 represents the main memory of system 900 and provides storage for code to be executed by processor 910, or data values to be used in executing a routine. Memory subsystem 920 can include one or more memory devices 930 such as read-only memory (ROM), flash memory, one or more varieties of random access memory (RAM) such as DRAM, or other memory devices, or a combination of such devices. Memory 930 stores and hosts, among other things, operating system (OS) 932 to provide a software platform for execution of instructions in system 900. Additionally, applications 934 can execute on the software platform of OS 932 from memory 930. Applications 934 represent programs that have their own operational logic to perform execution of one or more functions. Processes 936 represent agents or routines that provide auxiliary functions to OS 932 or one or more applications 934 or a combination. OS 932, applications 934, and processes 936 provide software logic to provide functions for system 900. In one example, memory subsystem 920 includes memory controller 922, which is a memory controller to generate and issue commands to memory 930. It will be understood that memory controller 922 could be a physical part of processor 910 or a physical part of interface 912. For example, memory controller 922 can be an integrated memory controller, integrated onto a circuit with processor 910.

In some examples, OS 932 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others. In some examples, a driver can configure network interface 950 to allocate packets for transmission to fine or coarse grained lists, as described herein. In some examples, a driver can enable or disable offload to network interface 950 of allocating packets for transmission to fine or coarse grained lists and perform packet transmission scheduling, as described herein. A driver can advertise capability of network interface 950 to perform one or more aspects of network interface 950 to allocate packets for transmission to fine or coarse grained lists and perform packet transmission scheduling, as described herein.

While not specifically illustrated, it will be understood that system 900 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 900 includes interface 914, which can be coupled to interface 912. In one example, interface 914 represents an interface circuit, which can include standalone components and integrated circuitry. In one example, multiple user interface components or peripheral components, or both, couple to interface 914. Network interface 950 provides system 900 the ability to communicate with remote devices (e.g., servers or other computing devices) over one or more networks. Network interface 950 can include an Ethernet adapter, wireless interconnection components, cellular network interconnection components, USB (universal serial bus), or other wired or wireless standards-based or proprietary interfaces. Network interface 950 can transmit data to a device that is in the same data center or rack or a remote device, which can include sending data stored in memory.

Some examples of network interface 950 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

In one example, system 900 includes one or more input/output (I/O) interface(s) 960. I/O interface 960 can include one or more interface components through which a user interacts with system 900 (e.g., audio, alphanumeric, tactile/touch, or other interfacing). Peripheral interface 970 can include any hardware interface not specifically mentioned above. Peripherals refer generally to devices that connect dependently to system 900. A dependent connection is one where system 900 provides the software platform or hardware platform or both on which operation executes, and with which a user interacts.

In one example, system 900 includes storage subsystem 980 to store data in a nonvolatile manner. In one example, in certain system implementations, at least certain components of storage 980 can overlap with components of memory subsystem 920. Storage subsystem 980 includes storage device(s) 984, which can be or include any conventional medium for storing large amounts of data in a nonvolatile manner, such as one or more magnetic, solid state, or optical based disks, or a combination. Storage 984 holds code or instructions and data 986 in a persistent state (e.g., the value is retained despite interruption of power to system 900). Storage 984 can be generically considered to be a "memory," although memory 930 is typically the executing or operating memory to provide instructions to processor 910. Whereas storage 984 is nonvolatile, memory 930 can include volatile memory (e.g., the value or state of the data is indeterminate if power is interrupted to system 900). In one example, storage subsystem 980 includes controller 982 to interface with storage 984. In one example controller 982 is a physical part of interface 914 or processor 910 or can include circuits or logic in both processor 910 and interface 914.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory include a cache. A memory subsystem as described herein may be compatible with a number of memory technologies, such as DDR3 (Double Data Rate version 3, original release by JEDEC (Joint Electronic Device Engineering Council) on Jun. 16, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of one or more of the above, or other memory.

A power source (not depicted) provides power to the components of system 900. More specifically, power source typically interfaces to one or multiple power supplies in system 900 to provide power to the components of system 900. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 900 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (COX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

Example 1 includes one or more examples, and includes an apparatus comprising: a network interface device comprising circuitry to cause transmission of packets based on transmission times and use of at least one of multiple time slot granular scheduling lists, wherein the multiple time slot granular scheduling lists comprise at least one list of a first time slot duration and at least one list of a second time slot duration and wherein the first time slot duration is different than the second time slot duration.

Example 2 includes one or more examples, wherein a minimum delay value of a list of the at least one list of a second time slot duration corresponds to a maximum delay value of a list of the at least one list of a first time slot duration.

Example 3 includes one or more examples, wherein the at least one list of a first time slot duration comprises a fine granularity list and the at least one list of a second time slot duration comprises a coarse granularity list, and comprising circuitry to allocate a packet to a slot in a list of the at least one list of a second time slot duration based on a transmit time associated with the packet being outside of a time duration associated with the at least one list of a first time slot duration.

Example 4 includes one or more examples, wherein the at least one list of a first time slot duration comprises a fine granularity list, the at least one list of a second time slot duration comprises a coarse granularity list, and the circuitry is to copy identifiers of packets scheduled in the coarse granularity list to the fine granularity list based on a nominal time corresponding to a transmit time window associated with the at least one fine granularity list.

Example 5 includes one or more examples, wherein the at least one list of a first time slot duration comprises a fine granularity list, the at least one list of a second time slot duration comprises a coarse granularity list, and the circuitry is to schedule a packet for transmission by access from the fine granularity list.

Example 6 includes one or more examples, wherein the circuitry is to associate packet metadata with a time slot of the multiple time slot granular scheduling lists and wherein the associated packet metadata comprises one or more of: packet transmission timestamp, port identifier (ID), host identifier (HostID), Traffic Class, Function, virtual server instance (VSI) identifier, virtual machine (VM) identifier, cryptography related information, or scatter gather list (SGL) pointers in host memory.

Example 7 includes one or more examples, and includes a memory device to store the multiple time slot granular scheduling lists.

Example 8 includes one or more examples, wherein the circuitry is to associate packet metadata for multiple, different time windows with a time slot of the at least one list of a first time slot duration.

Example 9 includes one or more examples, wherein the circuitry is to store packet metadata into a cache and evict packet metadata from the cache based on associated transmit timestamp.

Example 10 includes one or more examples, wherein the network interface device comprises one or more of:

network interface controller (NIC), a remote direct memory access (RDMA)-enabled NIC, SmartNIC, router, switch, forwarding element, infrastructure processing unit (IPU), or data processing unit (DPU).

Example 11 includes one or more examples, and includes a server communicatively coupled to the network interface device, wherein the server is to request packet transmission and offload packet scheduling to the network interface device.

Example 12 includes one or more examples, and includes a datacenter, wherein the datacenter comprises the server and use of the use of at least one of multiple time slot granular scheduling lists is to reduce memory utilization in the datacenter.

Example 13 includes one or more examples, and includes at least one computer-readable medium comprising instructions stored thereon, that if executed by one or more processors, cause the one or more processors to: execute an operating system (OS) to cause offload of management of packet transmission times to a network interface device, wherein to manage packet transmission times, the network interface device is to use at least one of multiple time slot granular scheduling lists, wherein the multiple time slot granular scheduling lists comprise at least one list of a first time slot duration and at least one list of a second time slot duration, and wherein the first time slot duration is different than the second time slot duration.

Example 14 includes one or more examples, wherein the OS is to advertise a feature of offload of delay of packet transmission to the network interface device.

Example 15 includes one or more examples, wherein the OS is to offload to management of packet transmission according to a packet transmit time to the network interface device.

Example 16 includes one or more examples, wherein the at least one list of a first time slot duration comprises a fine granularity list, the at least one list of a second time slot duration comprises a coarse granularity list, and the network interface device is to copy identifiers of packets scheduled in the coarse granularity list to the fine granularity list based on a transmit time window corresponding to a transmit time window associated with the at least one fine granularity list.

Example 17 includes one or more examples, wherein a minimum delay value of a list of the at least one list of a second time slot duration corresponds to a maximum delay value of a list of the at least one list of a first time slot duration.

Example 18 includes one or more examples, wherein the network interface device is to associate packet metadata with a time slot of the multiple time slot granular scheduling lists and wherein the associated packet metadata comprises one or more of: packet transmission timestamp, port identifier (ID), host identifier (HostID), Traffic Class, Function, virtual server instance (VSI) identifier, virtual machine (VM) identifier, cryptography related information, or scatter gather list (SGL) pointers in host memory.

Example 19 includes one or more examples, and includes a method comprising: managing, by a network interface device, transmission of packets at transmission times based on use of at least one of multiple time slot granular scheduling lists, wherein the multiple time slot granular scheduling lists comprise at least one list of a first time slot duration and at least one list of a second time slot duration, wherein the first time slot duration is different than the second time slot duration.

Example 20 includes one or more examples, wherein the at least one list of a first time slot duration comprises a fine granularity list and the at least one list of a second time slot duration comprises a coarse granularity list, and comprising: copying, by the network interface device, identifiers of packets scheduled in the coarse granularity list to the fine granularity list based on a transmit time window corresponding to a transmit time window associated with the at least one fine granularity list.

Example 21 includes one or more examples, wherein the at least one list of a first time slot duration comprises a fine granularity list corresponds to a transmit time window that is within X seconds of a current transmit time and the at least one list of a second time slot duration corresponds to a transmit time window that is outside of X seconds of the current transmit time.

Example 22 includes one or more examples, wherein the at least one list of a first time slot duration comprises a fine granularity list and the at least one list of a second time slot duration comprises a coarse granularity list and comprising: scheduling, by the network interface device, a packet for transmission by access from the fine granularity list.

Example 23 includes one or more examples, and includes associating, by the network interface device, packet metadata with a time slot of the multiple time slot granular scheduling lists, wherein the associated packet metadata comprises one or more of: packet transmission timestamp, port identifier (ID), host identifier (HostID), Traffic Class, Function, virtual server instance (VSI) identifier, virtual machine (VM) identifier, cryptography related information, or scatter gather list (SGL) pointers in host memory.

Example 24 includes one or more examples, wherein the network interface device comprises one or more of: network interface controller (NIC), a remote direct memory access (RDMA)-enabled NIC, SmartNIC, router, switch, forwarding element, infrastructure processing unit (IPU), or data processing unit (DPU).

Example 25 includes one or more examples, wherein the packets include media data for an on-demand media streaming service.

What is claimed is:

1. An apparatus comprising:
a network interface device comprising:
a host interface circuitry;
a network interface circuitry;
direct memory access (DMA) circuitry; and
second circuitry to cause transmission of packets based on transmission times and use of at least one of multiple timing wheels, wherein:
the multiple timing wheels comprise a first timing wheel having a first time slot duration and a second timing wheel having a second time slot duration,
the first time slot duration is shorter than the second time slot duration, the packets comprise a first packet,
based on a first time difference between a current time and a time slot of the first packet assigned to the second timing wheel, the second circuitry is to copy an identifier of the first packet from the second timing wheel to the first timing wheel prior to transmission of the first packet, based on a second time difference between the current time and the time slot of the first packet assigned to the second timing wheel, the second circuitry is to retain the identifier of the first packet in the second timing wheel, and the second time difference is larger than the first time difference.

2. The apparatus of claim 1, wherein the packets comprise a second packet and the second circuitry is to allocate the second packet to a slot in the second timing wheel based on a transmit time associated with the packet being outside of a time duration associated with the first timing wheel.

3. The apparatus of claim 1, wherein the packets comprise a second packet, the second circuitry is to schedule the second packet for transmission by access from the first timing wheel by re-assignment of the second packet from the second timing wheel to the first timing wheel, and the second circuitry is to re-assign the second packet from the second timing wheel to the first timing wheel based on a difference between a transmission time stamp of the second packet and a current packet transmission time stamp.

4. The apparatus of claim 1, wherein the second circuitry is to associate packet metadata with a time slot of the multiple timing wheels and wherein the associated packet metadata comprises one or more of: packet transmission timestamp, port identifier (ID), host identifier (HostID), Traffic Class, Function, virtual server instance (VSI) identifier, virtual machine (VM) identifier, cryptography related information, or scatter gather list (SGL) pointers in host memory.

5. The apparatus of claim 1, comprising a memory device to store the multiple timing wheels.

6. The apparatus of claim 1, wherein the second circuitry is to associate packet metadata for multiple, different time windows with a time slot of the first timing wheel.

7. The apparatus of claim 1, wherein:

the packets comprise a second packet and the second circuitry is to store second packet metadata into a cache and based on a depth of the cache, evict the second packet metadata from the cache based on an associated transmit timestamp of the second packet and a current timestamp.

8. The apparatus of claim 1, wherein the network interface device comprises one or more of: network interface controller (NIC), a remote direct memory access (RDMA)-enabled NIC, SmartNIC, router, switch, forwarding element, infrastructure processing unit (IPU), or data processing unit (DPU).

9. The apparatus of claim 1, comprising a server communicatively coupled to the network interface device, wherein the server is to request packet transmission and offload packet scheduling to the network interface device.

10. The apparatus of claim 9, comprising a datacenter, wherein the datacenter comprises the server and the server is to use at least one of multiple timing wheels.

11. A method comprising:

managing, by a network interface device, transmission of packets at transmission times based on use of at least one of multiple timing wheels, wherein:

the multiple timing wheels comprise at least a first timing wheel of a first time slot duration and a second timing wheel of a second time slot duration, the first time slot duration is less than the second time slot duration, and the packets comprise a first packet, the managing transmission of packets at transmission times based on use of at least one of multiple timing wheels comprises:

based on a first time difference between a current time and a time slot of the first packet assigned to the second timing wheel, copying an identifier of the first packet from the second timing wheel to the first timing wheel for egress from the first timing wheel and based on a second time difference between the current time and the time slot of the first packet assigned to the second timing wheel, retaining the identifier of the first packet in the second timing wheel, wherein the second time difference is larger than the first time difference.

12. The method of claim 11, wherein the first timing wheel comprises a transmit time window that is within X seconds of a current packet transmit time and the second timing wheel comprises a transmit time window that is outside of X seconds of the current packet transmit time.

13. The method of claim 11, comprising:

associating, by the network interface device, packet metadata with a time slot of the multiple timing wheels, wherein the associated packet metadata comprises one or more of: packet transmission timestamp, port identifier (ID), host identifier (HostID), Traffic Class, Function, virtual server instance (VSI) identifier, virtual machine (VM) identifier, cryptography related information, or scatter gather list (SGL) pointers in host memory.

14. The method of claim 11, wherein the network interface device comprises one or more of: network interface controller (NIC), a remote direct memory access (RDMA)-enabled NIC, SmartNIC, router, switch, forwarding element, infrastructure processing unit (IPU), or data processing unit (DPU).

15. The method of claim 11, wherein the packets include media data for an on-demand media streaming service.

* * * * *